A. W. DUCK.
SADDLE MOUNT.
APPLICATION FILED MAR. 14, 1912.
1,050,925.
Patented Jan. 21, 1913.
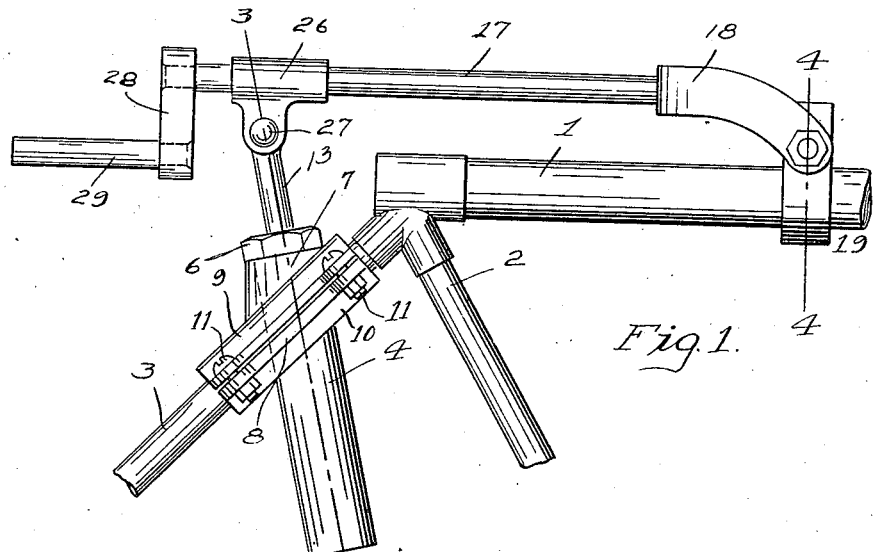
Fig. 1.
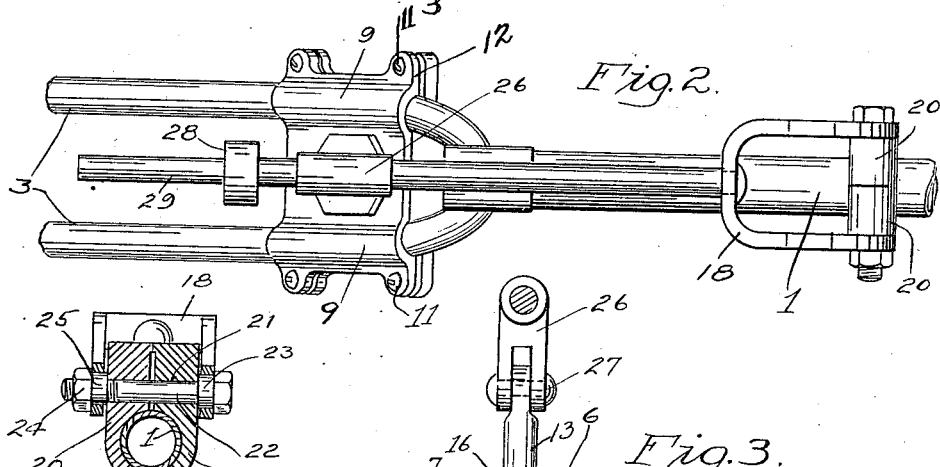
Fig. 2.
Fig. 4.
Fig. 3.
WITNESSES:
H. A. Stock.
F. P. Schroeder.
INVENTOR
ABRAM W. DUCK
BY
Harry C. Schroeder
His ATTORNEY

UNITED STATES PATENT OFFICE.

ABRAM W. DUCK, OF OAKLAND, CALIFORNIA.

SADDLE-MOUNT.

1,050,925.  Specification of Letters Patent.  Patented Jan. 21, 1913.

Application filed March 14, 1912. Serial No. 683,699.

*To all whom it may concern:*

Be it known that I, ABRAM W. DUCK, citizen of the United States, residing at Oakland, in the county of Alameda and State of California, have invented certain new and useful Improvements in Saddle-Mounts, of which the following is a specification.

My present invention relates to resilient mounts for vehicle seats, such as are used in connection with bicycles.

The principal objects of my invention are to provide a device which will absorb the greater part of the shock imparted to the vehicle frame, in travel, and thus provide for easy riding.

Further objects of my invention are to so dispose the seat with respect to elements of the mount as to avoid undesirable tortional stresses upon certain other elements, and to adapt the device for application to bicycles which were not originally designed to be equipped with devices constructed according to my invention.

In the accompanying drawings, forming a part of this specification, my invention is disclosed, by way of example, as applied to a bicycle frame.

In the drawings: Figure 1 is a fragmentary elevation of a bicycle frame with the device embodying my invention attached thereto. Fig. 2 is a top plan view of the device as disclosed in Fig. 1. Fig. 3 is a sectional view on substantially the lines 3—3 of Fig. 1. Fig. 4 is a cross-sectional view on the line 4—4 of Fig. 1.

Similar characters refer to similar parts throughout the views.

A bicycle frame may include the usual horizontal bar 1, diagonal brace rod 2, and rear forks 3. When the tube 2 is not of sufficient diameter, or not accessible for adaptation to the needs of my invention, or when there is no tubing upon the vehicle for the purpose hereinafter disclosed, I provide a cylinder 4, having a closed end 5 and detachable head 6. Two co-acting clamp members 7 and 8 are adapted to rigidly secure the cylinder in connection with the vehicle. As shown in the drawing, the upper clamp member 7 contacts with the head 6, and is provided with suitably shaped extensions 9 for embracing the forks 3, while the clamp member 8 has complementarily formed extensions 10 which also embrace the forks 3 and the two members are rigidly secured together by screws 11, passing through complementally formed apertured extensions 12.

Within the cylinder 4 or its equivalent, is a reciprocable rod or standard like member 13, passing through the head 6 and provided with a collar 14, preferably intermediate its ends, and within the cylinder. This collar 14 is adapted to confine extension springs 15 and 16 between itself and the end and head, respectively, of the cylinder 4. I prefer to so construct the collar 14 that it will fit nicely within the cylinder 4, thus guiding the rod 13 in its movement, and that portion of rod 13 below collar 14 and about which spring 15 is coiled, serves to retain the spring in operative relation to the collar 14.

In connection with the horizontal bar 1, or preferably in advance of the cylinder 4, I pivotally mount a vertically oscillatable rod 17, through its downwardly arched forked end 18, and a clamping device designated generally as 19, this rod to coöperate with reciprocable rod 13 in mounting the seat.

Referring more particularly to clamp 19 and the parts associated therewith, I prefer to provide two complementary clamp portions 20, having openings 21, and adapted to embrace the bar 1, as shown in Fig. 4 of the drawing. A bolt 22 which holds the portions 20 in gripping relation is provided with a cylindrical portion 23 next adjacent its head, to form a bearing for one of the bifurcations of the fork 18, while the nut 24, for bolt 22, has a similar cylindrical portion 25 forming a bearing for the other bifurcation of the fork. This bolt 22 and nut 24 not only holds the clamp 19 in place, but also forms a bearing for oscillatable mounting rod 17.

The rod 17 is supported in connection with rod 13, by a sleeve 26, movable freely with respect to the former and pivotally connected to the latter as at 27. It is, by rod 17, that the seat, not shown in the drawing, is carried, and, in order to avoid excessive tortional stress upon rod 17 and particularly at the forked connection with the clamp 19, I provide a downwardly extending member 28, preferably at right angle, to rod 17, in order to condense the device, and member 29, carried by member 28, preferably parallel to the rod 17, these members, 28 and 29 forming a crank like device to which the seat is secured. It will be noted that by this construction, the seat is practically carried pendently by rod 17 and because of this disposition of parts, there is less tendency for the rod to twist, and, further, such disposition aids in attaining easy riding upon the seat.

The operation of the device is as follows: When the rider mounts the seat, the rod 17 is swung downwardly and movement is imparted to rod 13, through sleeve 26. The spring 15 then resiliently supports the rod 13. As the vehicle is moved over uneven surfaces, the shocks are absorbed by the spring 15 acting in conjunction with spring 16 to prevent excessive upward movement of the seat structure when a large obstruction has been encountered.

I claim:

1. In a resilient mount for cycle seats, the combination with a cycle frame having a horizontal bar, of a clamp device adapted to be secured to the said horizontal bar in various positions, an oscillatable rod extending rearwardly with respect to said clamp device and pivotally carried thereby, said oscillatable rod being adapted to carry the cycle seat, a reciprocable rod, means for resiliently mounting said rod in connection with the cycle frame, and a sleeve loosely embracing said oscillatable rod and pivotally connected with said reciprocable rod to transmit movement from one to the other, but permitting oscillation of said first mentioned rod and reciprocation of said second mentioned rod, said sleeve being slidable upon said oscillatable rod, substantially as and for the purpose set forth.

2. In a resilient mount for cycle seats, the combination with cycle framework, of an oscillatable member pivotally carried thereby and having a downward and rearwardly extending portion opposite its pivotal connection with the cycle frame, the said rearwardly extending portion being adapted for the reception of the cycle seat, a standard-like, reciprocable member operatively connected to said oscillatable rod to transmit movement from one to the other, and resilient means for mounting said reciprocable member permitting movement of the cycle frame with respect thereto.

3. In a resilient mount for cycle seats, the combination with a cycle frame having a horizontal bar, a two-part clamp adapted to embrace the said horizontal bar, a bolt provided with a cylindrical portion adapted to engage the clamp parts, a nut provided with a cylindrical portion co-acting with said bolt to retain said clamp in gripping relation to said horizontal bar, an oscillatable bar, a fork carried by said bar and having its bifurcations pivotally carried by the said cylindrical portions of said bolt and nut, a reciprocable standard-like rod a sleeve carried by said reciprocable rod and loosely embracing said oscillatable rod, yieldable means for resiliently mounting said reciprocable rod, and means carried by said oscillatable rod for mounting the seat.

4. In a resilient mount for cycle seats, the combination with a cycle frame having a horizontal bar, a two-part clamp adapted to embrace the said horizontal bar, a bolt provided with a cylindrical portion adapted to engage said clamp parts, a nut provided with a cylindrical portion co-acting with said bolt to retain said clamp in gripping relation to said horizontal bar, an oscillatable bar, a downwardly arched fork carried by said bar and having its bifurcations pivotally carried by the said cylindrical portions of said bolt and nut, a reciprocable standard-like rod, a sleeve carried by said reciprocable rod and loosely embracing said oscillatable rod, yieldable means for resiliently mounting said reciprocable rod, and a crank-like device rigidly carried by said oscillatable rod, substantially as and for the purpose set forth.

In testimony whereof I affix my signature in presence of two witnesses.

ABRAM W. DUCK.

Witnesses:
F. P. SCHROEDER,
W. A. STOCK.